UNITED STATES PATENT OFFICE.

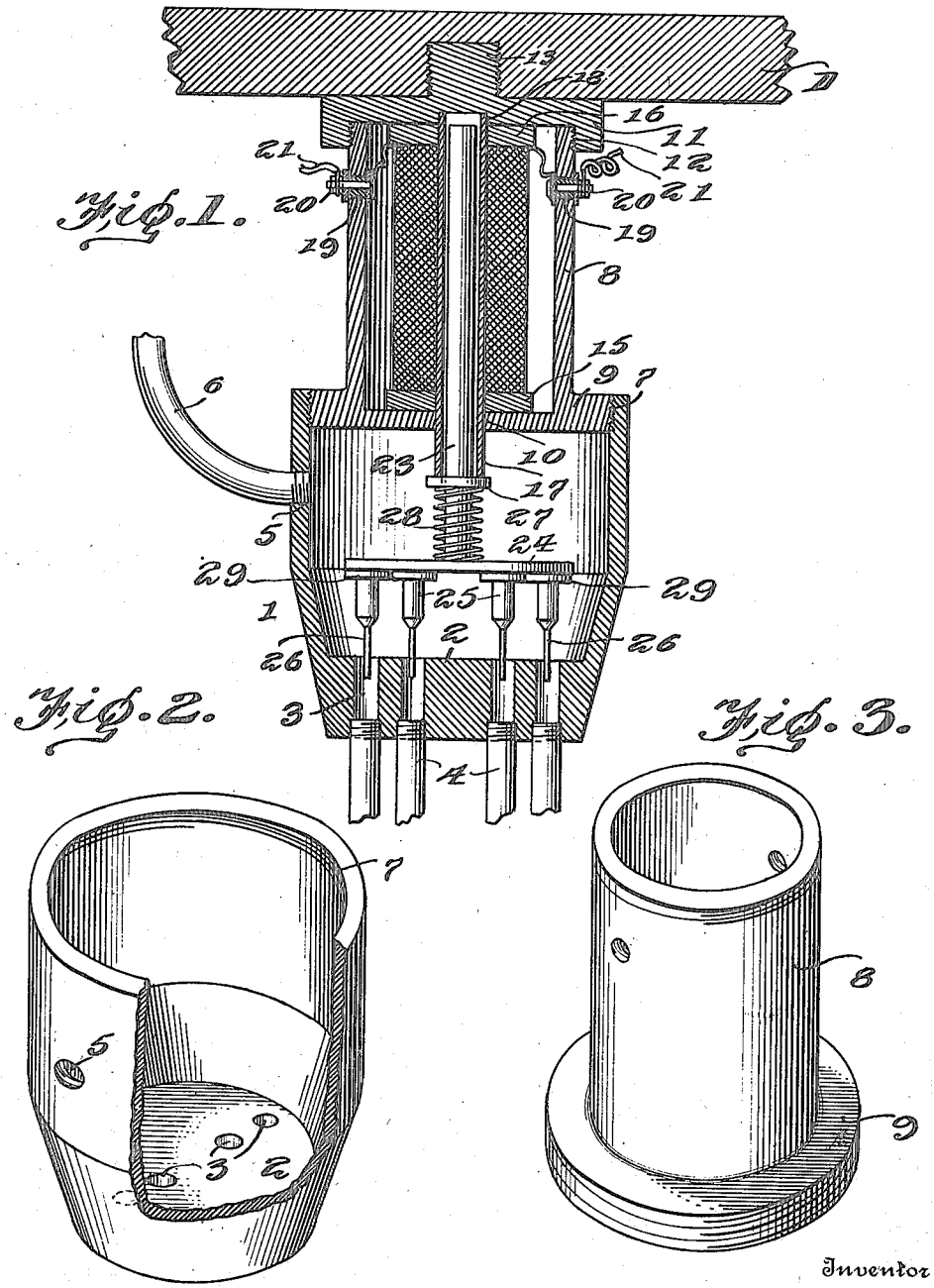

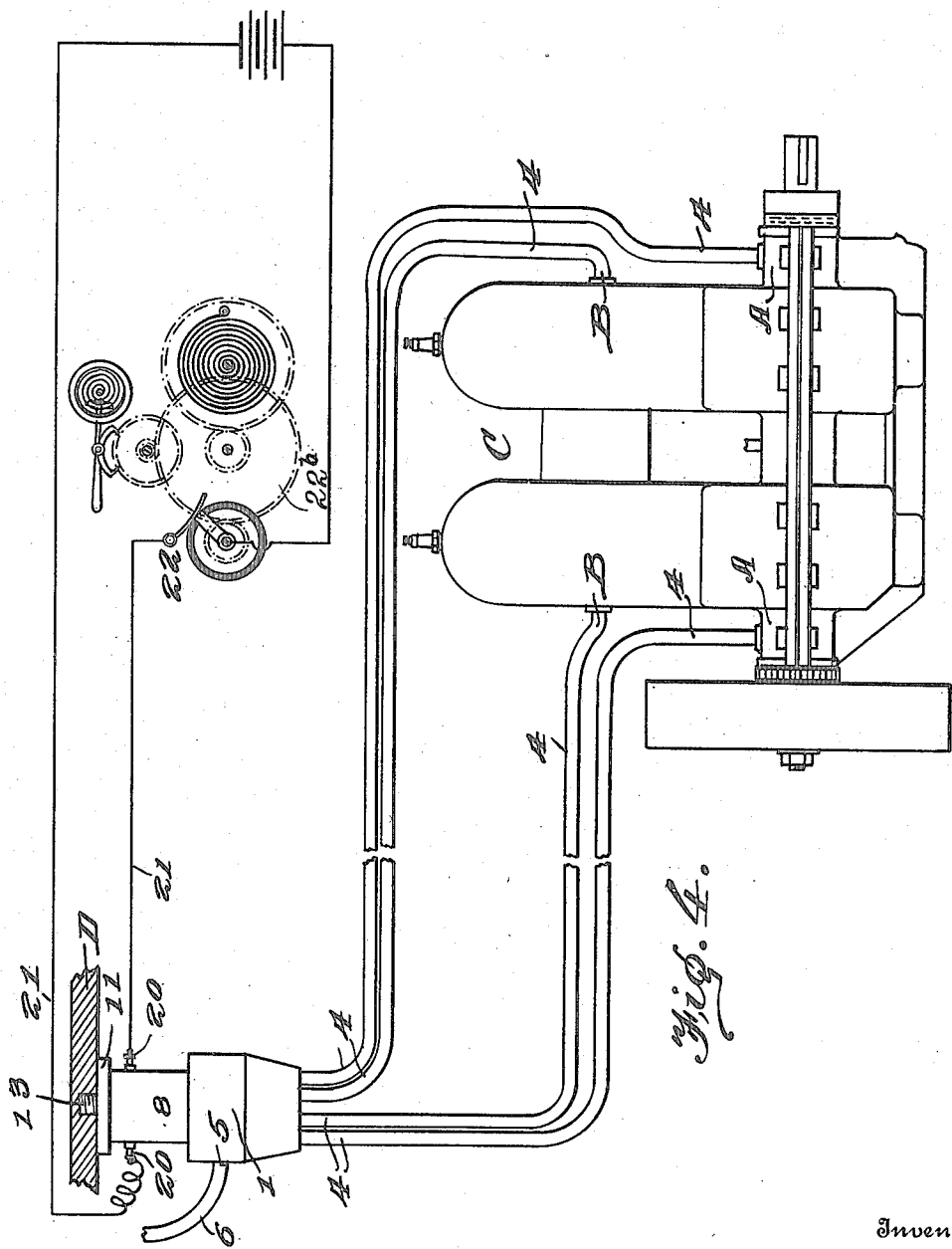

GEORGE M. ROGERS, OF CHICAGO, ILLINOIS.

MACHINE-OILER.

1,202,895.            Specification of Letters Patent.        Patented Oct. 31, 1916.

Application filed February 29, 1916. Serial No. 81,244.

*To all whom it may concern:*

Be it known that I, GEORGE M. ROGERS, a citizen of the United States, residing at Chicago, in the county of Cook and State of Illinois, have invented new and useful Improvements in Machine-Oilers, of which the following is a specification.

This invention relates to improvements in oilers for applying lubricating oil to bearings or other machine elements, the object of the invention being to provide an improved oiler of this class which is simple in construction and which embodies electrically actuated means for opening a series of valves and permitting the feeding of oil from the cup to a number of bearings or other machine elements at will, and which can be operated with either an electrical or mechanical timer and can be so arranged as to feed the required amount of oil to each bearing or machine element, and which will require but very slight attention on the part of the attendant.

The invention consists in the construction, combination, and arrangement of devices, hereinafter described and claimed.

In the accompanying drawings:—Figure 1 is a vertical sectional view of an electrically operated oiler constructed in accordance with my invention and showing the valves in raised, open position. Figs. 2 and 3 are detail views. Fig. 4 is a diagrammatic elevation of an automobile motor, showing one of my improved electrically operated oilers arranged for supplying oil to the motor and in connection with an electric circuit and switch for electrically operating the oiler.

My improved oiler comprises a cup 1 of suitable shape and dimensions and which is here shown as having a tapered lower portion, the bottom 2 of the cup being provided with a series of vertical oil discharge openings 3, each of which is counterbored and threaded at its lower end so that pipes 4 may be attached to the bottom of the cup to convey oil from the cup to the bearings A, cylinders B or other parts to be lubricated. An automobile motor is here shown at C as connected to the oiler. In one side of the cup is a threaded opening 5 to which is attached an oil feed pipe 6 which serves to keep the cup supplied with lubricating oil from a suitable tank or other reservoir. The upper end of the cup is open and is internally threaded as at 7.

A casing 8 which is cylindrical in form is provided with an enlarged circular base 9 which is screwed into the upper end of the cup and closes the same. The base has a circular opening 10 of suitable diameter. A cap 11 is screwed on the upper end of the casing as at 12 and is provided on its upper side at the center with a screw stud 13 which by engaging a threaded opening in a suitable support D serves to hold the oiler in an upright position.

A solenoid 14 is arranged in the casing and has a spool which comprises a lower head 15 that bears on the bottom of the casing, an upper head 16, and a tubular core or sleeve 17, the lower end of which extends down through the central opening 10 of the bottom of the casing and the upper end of which is fitted in a central counter bore 18 in the under-side of the cap. Insulators 19 are arranged in openings in opposite sides of the cap and the terminals of the windings of the solenoid pass through said insulators and are provided with connectors 20 for the attachment of conducting wires 21 of an electric circuit, which includes the windings of the solenoid and also includes a switch 22 operated by a time mechanism, 22$^b$ and by means of which the circuit may be opened and closed at will.

A plunger rod 23, which is made of steel is arranged to operate vertically in the tubular bore or sleeve of the solenoid and its lower end which extends into the oil cup is provided with a member 24 to the under side of which a series of valves 25 are attached, each valve having a tapered lower end to close in one of the oil openings 3 and being also provided with a centrally arranged downwardly extending pin 26, which acts as a guide for the valve. A washer 27 is fitted loosely on the plunger to bear against the lower end of the tubular core sleeve 17 and a spring 28 is coiled around the lower portion of the plunger rod 23 and bears between the member 24 and the washer and serves, when the solenoid is deënergized, to move said plunger rod downwardly with the member 24 and valve 25 and close the latter in the openings 3. A rubber gasket 29 is placed around the bore of each valve, to closely flush on the bottom of the oil cup when the plunger is lowered.

When it is desired to supply lubricating oil to the bearings or other machine elements, the electric circuit is closed by means of the switch and the solenoid energized, the plunger rod being thus moved upwardly with the member 24 and valves and opening the latter from the openings 3.

As many valves and feed pipes may be provided as desired.

The oiler may be operated with the timer, either electrically or mechanically, and the timer can be set so as to give the proper amount of electric current and thus regulate the quantity of oil fed through each pipe.

Any suitable form of electrically operated means may, within the scope of the invention, be employed for actuating the plunger and its valves, instead of the solenoid, if desired.

The oiler and also the tubing may be made of any suitable material, such as metal, glass, or other material.

If desired, an electric light may be included in the circuit which operates the oiler or oilers, to illuminate the same and enable the attendant to readily ascertain whether the oiler is operating and to also ascertain the condition of the timer.

Having described the invention, what is claimed is:

1. An oiler of the class described comprising a cup having an oil feed opening, a valve arranged for vertical movement and to normally close said opening, a spring to normally hold the valve in closed position, a solenoid core piece connected to said valve, a solenoid coil arranged above the cup and having a tubular sleeve in which the core piece is guided, a casing on the cup and in which the solenoid coil is arranged, and a cap closing the upper end of the casing and having an attaching member.

2. An oiler of the class described comprising a cup having a plurality of oil feed openings in the bottom, an oil feed pipe connected to the cup, oil discharge pipes leading from said openings in the bottom of said cup, a plunger rod, a member at the lower end thereof provided with valves to open and close said openings, and a solenoid on the cup and having a sleeve in which the plunger rod operates, said plunger rod constituting the core piece of the solenoid.

3. An oiler of the class described comprising a cup having an oil feed opening, a valve arranged for vertical movement and to normally close said opening, a spring to normally hold the valve in closed position, a solenoid core piece attached to said valve, and a solenoid coil arranged above the cup and through which the core piece extends and is guided.

4. An oiler of the class described comprising a cup having an oil feed opening in the bottom, an oil feed pipe connected to the cup and leading from the lower end of said opening, a plunger rod arranged for vertical movement in the cup, a member at the lower end of said plunger rod, a valve at the lower end of said member and corresponding in shape and diameter with the opening and adapted to fit in said opening when the plunger rod is lowered, said valve having a guide pin extending downwardly therefrom, a gasket arranged under said member and around the upper end of said valve and adapted to bear on the bottom of the cup when the plunger is lowered, and electrically connected means to operate the said plunger rod and valve.

In testimony whereof I affix my signature in presence of two witnesses.

GEORGE M. ROGERS.

Witnesses:
A. EPHRAIM IVER,
MARTIN MADSEN.